United States Patent
Benzaia et al.

(10) Patent No.: US 10,609,462 B2
(45) Date of Patent: Mar. 31, 2020

(54) ACCESSORY DEVICE THAT PROVIDES SENSOR INPUT TO A MEDIA DEVICE

(71) Applicant: AT&T Intellectual Property I, LP, Atlanta, GA (US)

(72) Inventors: Thomas P. Benzaia, Sugarland, TX (US); Lakshminarashimhan Naidu, Pearland, TX (US); Bernard S. Ku, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/728,897

(22) Filed: Oct. 10, 2017

(65) Prior Publication Data

US 2018/0048950 A1 Feb. 15, 2018

Related U.S. Application Data

(63) Continuation of application No. 14/527,513, filed on Oct. 29, 2014, now Pat. No. 9,826,297.

(51) Int. Cl.
*G06F 3/01* (2006.01)
*H04R 1/02* (2006.01)
(Continued)

(52) U.S. Cl.
CPC ......... *H04R 1/028* (2013.01); *G01C 21/3602* (2013.01); *G01C 21/3626* (2013.01);
(Continued)

(58) Field of Classification Search
CPC .............................. G01C 21/3602; H04R 1/028
See application file for complete search history.

(56) References Cited

U.S. PATENT DOCUMENTS

| 3,887,896 A | 6/1975 | Ramstedt |
| 3,987,403 A | 10/1976 | Smith |

(Continued)

FOREIGN PATENT DOCUMENTS

| EP | 0503214 A1 | 9/1992 |
| GB | 2467668 A | 8/2010 |

(Continued)

OTHER PUBLICATIONS

"This 'hand's free' smartwatch is powered by voice and gesture control", Venturebeat.com, Retrieved from <www.venturebeat.com/2013/06/24/this-hands-free-smartwatch-is-powered-by-voice-and-gesture-control/>, Jun. 24, 2013, 1 page.

(Continued)

*Primary Examiner* — Jess Whittington
(74) *Attorney, Agent, or Firm* — Guntin & Gust, PLC; Andrew Raymond

(57) ABSTRACT

A method includes receiving information at a media device from an accessory device. The information includes first image data captured by a camera and second image data captured by the camera subsequent to capture of the first image data. The camera is a component of an earpiece of the accessory device. The method includes identifying, at a processor of the media device, a particular limb movement of a user of the accessory device based on the information. The method also includes performing an action with the processor, the action based on the particular limb movement.

18 Claims, 8 Drawing Sheets

(51) Int. Cl.
- *H04N 7/18* (2006.01)
- *G01C 21/36* (2006.01)
- *H04N 5/247* (2006.01)
- *H04S 7/00* (2006.01)
- *H04R 1/10* (2006.01)

(52) U.S. Cl.
CPC .............. *G06F 3/011* (2013.01); *G06F 3/012* (2013.01); *G06F 3/017* (2013.01); *H04N 5/247* (2013.01); *H04N 7/185* (2013.01); *H04S 7/304* (2013.01); *H04R 1/1041* (2013.01); *H04S 2400/11* (2013.01)

(56) References Cited

U.S. PATENT DOCUMENTS

| | | | |
|---|---|---|---|
| 4,680,740 A | 7/1987 | Treptow | |
| 4,692,763 A | 9/1987 | Gregg, Jr. | |
| 4,713,669 A | 12/1987 | Shuch | |
| 5,587,718 A | 12/1996 | Iardella et al. | |
| 5,647,016 A | 7/1997 | Takeyama | |
| 5,861,846 A | 1/1999 | Minter | |
| 5,920,024 A * | 7/1999 | Moore | G10H 1/00 356/28 |
| 6,011,754 A | 1/2000 | Burgess et al. | |
| 6,069,585 A | 5/2000 | Lanciaux | |
| 6,684,176 B2 | 1/2004 | Willins et al. | |
| 7,096,120 B2 | 8/2006 | Hull | |
| 7,130,759 B2 | 10/2006 | Willins et al. | |
| 8,112,281 B2 | 2/2012 | Yeung et al. | |
| 8,251,875 B2 | 8/2012 | Ellis et al. | |
| 8,578,773 B1 | 11/2013 | Feng et al. | |
| 8,718,930 B2 | 5/2014 | Tachibana et al. | |
| 2003/0190076 A1* | 10/2003 | DeLean | G06F 21/32 382/209 |
| 2004/0030491 A1* | 2/2004 | Hull | H04L 29/06 701/433 |
| 2004/0052418 A1* | 3/2004 | DeLean | G06F 21/32 382/209 |
| 2010/0039493 A1* | 2/2010 | Chao | G02B 27/017 348/14.02 |
| 2010/0118158 A1* | 5/2010 | Boland | H04N 5/23203 348/211.2 |
| 2010/0245585 A1* | 9/2010 | Fisher | H04M 1/6066 348/164 |
| 2011/0135098 A1 | 6/2011 | Kuhr et al. | |
| 2011/0200213 A1* | 8/2011 | Knox | H04R 25/505 381/314 |
| 2012/0114132 A1* | 5/2012 | Abrahamsson | H04R 1/1016 381/74 |
| 2012/0120070 A1 | 5/2012 | Baillot | |
| 2013/0084805 A1 | 4/2013 | Pasquero et al. | |
| 2013/0162514 A1* | 6/2013 | Zawacki | G06F 1/3206 345/156 |
| 2013/0191246 A1 | 7/2013 | Calman et al. | |
| 2013/0217370 A1 | 8/2013 | Gerald et al. | |
| 2013/0278631 A1* | 10/2013 | Border | G02B 27/017 345/633 |
| 2013/0322667 A1 | 12/2013 | Christensen | |
| 2013/0332273 A1 | 12/2013 | Gu et al. | |
| 2014/0063055 A1* | 3/2014 | Osterhout | G06F 3/005 345/633 |
| 2014/0079257 A1 | 3/2014 | Ruwe et al. | |
| 2014/0191964 A1* | 7/2014 | McDonald | G06F 3/011 345/158 |
| 2014/0195166 A1 | 7/2014 | Rahman et al. | |
| 2014/0240313 A1 | 8/2014 | Varga | |
| 2014/0267637 A1 | 9/2014 | Hoberman et al. | |
| 2014/0269425 A1* | 9/2014 | Fisher | H04L 41/0809 370/254 |
| 2014/0333650 A1 | 11/2014 | Jung et al. | |
| 2014/0365113 A1* | 12/2014 | McGavran | G01C 21/00 701/425 |
| 2015/0030159 A1* | 1/2015 | Ozcan | G06F 3/165 381/17 |
| 2015/0211858 A1* | 7/2015 | Jerauld | G02B 27/017 701/541 |
| 2015/0227196 A1 | 8/2015 | Fujii et al. | |
| 2015/0260474 A1* | 9/2015 | Rublowsky | F41A 33/00 434/16 |
| 2015/0309316 A1 | 10/2015 | Osterhout et al. | |
| 2015/0324646 A1* | 11/2015 | Kimia | G06T 7/80 348/62 |
| 2016/0109954 A1* | 4/2016 | Harris | G06F 3/017 345/156 |
| 2016/0259027 A1* | 9/2016 | Said | H04W 4/33 |

FOREIGN PATENT DOCUMENTS

| | | |
|---|---|---|
| JP | 2002005675 A | 1/2002 |
| WO | 2001055833 A1 | 8/2001 |

OTHER PUBLICATIONS

Pombinho, P. et al., "Point of interest awareness using indoor positioning with a mobile phone", Proceedings of the 1st International Conference on Pervasive and Embedded Computing and Communication Systems, Mar. 2011, 10 pages.

Joffrion, J. M. et al., "Head Tracking for Using a GPS-Aided 3D Audio MEMS IMU", Air Force Research Laboratory, AFRL-HE-WP-JA-2006-02, Feb. 2006, 12 pages.

Singh, Y., "All Smartphone Interfacing With Microcontroller", International Conference on Computer Science & Engineering (ICCSE), Mar. 2013, 3 pages.

Kreyos, Wikipedia, Retrieved from <http://en.wikipedia.org/w/index.php?title=Kreyos&oldid=627350769>, Retrieved on Oct. 2, 2014, 5 pages.

Nasiri, S. et al., "Selection and integration of MEMS-based motion processing in consumer apps." InvenSense, DPS Design Line, www.invensense.com, Jul. 8, 2009, 7 pages.

Tokarz, K. et al., "Walking assistant device with GPS and electronic compass", Proceedings of the 8th Conference on Applied Computer Science. World Scientific and Engineering Academy and Society (WSEAS), 2008, pp. 43-48.

* cited by examiner

US 10,609,462 B2

ACCESSORY DEVICE THAT PROVIDES SENSOR INPUT TO A MEDIA DEVICE

PRIORITY CLAIM

This application is a continuation of, and claims priority to, U.S. patent application Ser. No. 14/527,513, filed Oct. 29, 2014, which is hereby incorporated by reference in its entirety.

FIELD OF THE DISCLOSURE

The present disclosure is generally related to accessory devices that provide sensor input to a media device.

BACKGROUND

An accessory device, such as headphones, may be connected to a media device (e.g., a smartphone) via a wired audio interface (e.g., a mini phono jack), but the accessory device may provide limited information or no information to the media device for use by the media device in performing one or more functions.

DETAILED DESCRIPTION

Figure 1:
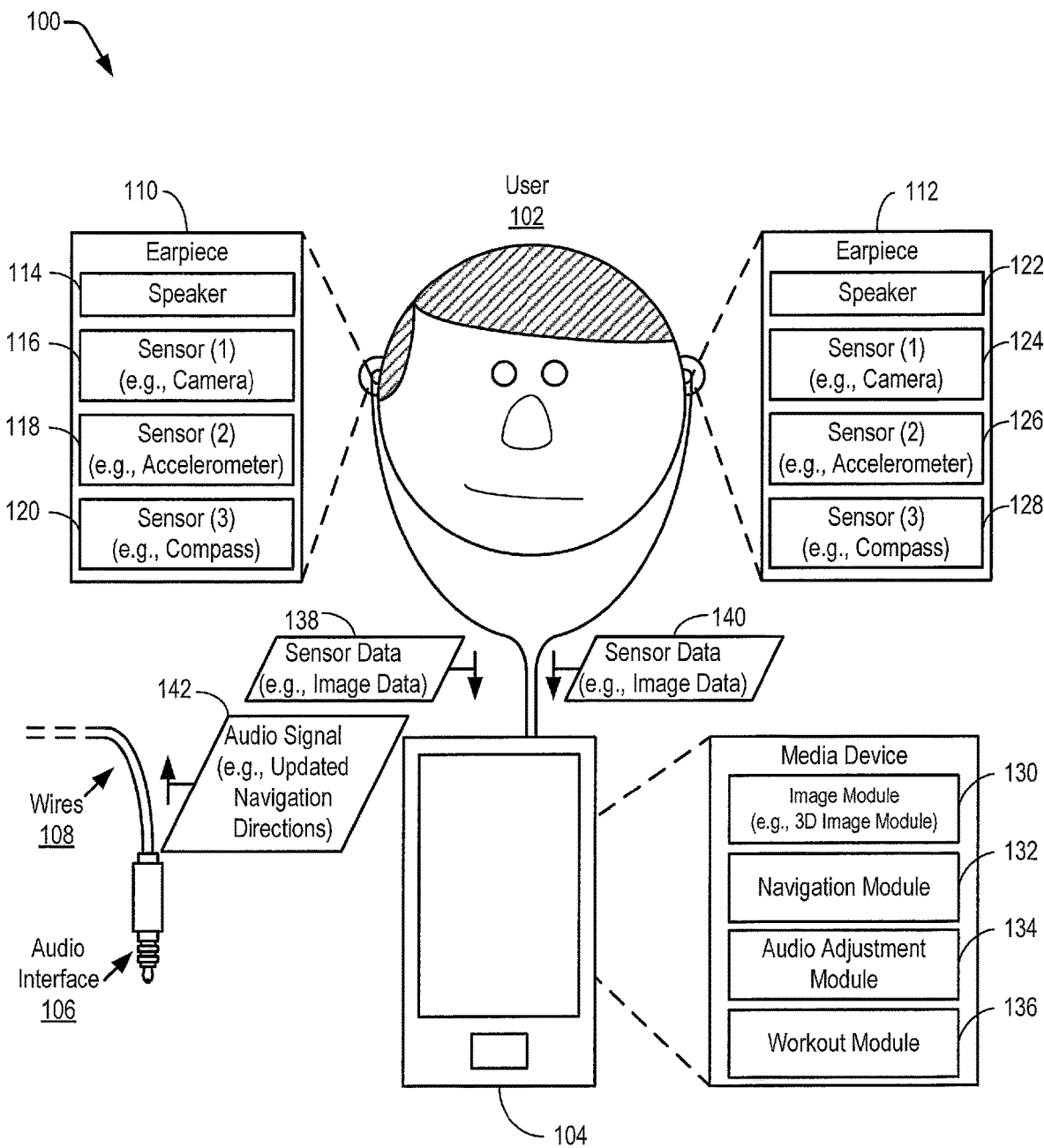
FIG. 1 is a diagram of a particular embodiment of a system for determining, based on information associated with a movement of an accessory device (that is communicatively coupled to a media device via a wired interface) whether the accessory device satisfies accessory device orientation criteria.

An accessory device (e.g., a wearable audio output device) may include a sensor in order to provide sensed data to a media device (e.g., a smartphone). In some cases, the sensor may be a media sensor (e.g., a camera) or a non-media sensor (e.g., a sensor other than an audio sensor or a video sensor). Examples of non-media sensors include an accelerometer, a compass, or a gyroscope, which may sense movement of the accessory device and provide information associated with the movement to the media device via an audio interface (e.g., a wired audio interface, such as a mini phono jack, or a wireless audio interface). For example, an audio headset device (e.g., headphones or ear buds) may include camera(s) in one or both earpieces, and the camera(s) may be used to determine user movement data (e.g., head movements, hand movements, or leg movements) and communicate the user movement data to the media device. Alternatively or additionally, the audio headset device may include an accelerometer to provide user movement data (e.g., head movements up, down, left, or right) and communicate the user movement data to the media device and/or a compass to provide user direction data (e.g., east, west, north or south) to the media device.

In some cases, information associated with movement of the accessory device may be useful while the media device is providing directions to the user. The media device may use the movement information (e.g., head movement(s), hand movement(s), leg movement(s), or a combination thereof) received from the sensor(s) of the accessory device in order to determine whether the accessory device satisfies particular orientation criteria (e.g., whether the user's head is correctly positioned for receiving directions to a particular location). When the accessory device does not satisfy the orientation criteria (e.g., when the user is facing the wrong direction), the media device may generate an audio signal for communication to a user of the accessory device via the wired audio interface.

In some cases, the audio signal may include accessory device re-orientation information that may identify a head movement to effect a re-orientation of the audio headset device so that the orientation criteria are satisfied. For example, when a navigation application is operating at the media device and has determined navigation directions to a particular location, the audio signal may include updated navigation directions with instructions to look right or to look left so that the user's head is correctly positioned for receiving directions to the particular location. To illustrate, if a user is looking for a coffee shop that is located in a direction to her left, when the user looks right, the media device may provide a message, such as "No, not that direction. Look the other way." By contrast, when the accessory device satisfies the orientation criteria, the media device may generate a second audio signal confirming that the user's head is correctly positioned. To illustrate, when the user looks left (the correct direction), the media device may provide another message, such as "Yes, right down that street you should see it on the left side of the road about 300 yards away." In the context of navigation directions, the media device may provide the updated navigation directions responsive to head movement(s), hand movement(s), leg movement(s), or a combination thereof. Thus, the present disclosure describes various illustrative examples of an accessory device that may provide sensed data to a media device, and the media device may perform one or more operations based at least in part on the sensed data.

In a particular embodiment, a method includes receiving information at a media device that is associated with movement of an accessory device. The accessory device is communicatively coupled to the media device via a wired interface of the media device (e.g., a cord and/or a mini-phone jack of the media device) or via a wireless interface of the media device. The method includes determining, at the media device, whether the accessory device satisfies accessory device orientation criteria based on the information. In response to determining that the accessory device does not satisfy the accessory device orientation criteria, the method includes generating a signal (e.g., an audio signal). The audio signal may be communicated from the media device to the accessory device via the wired interface. In some cases, the audio signal may include accessory device re-orientation information. In other cases, a video signal may be generated and displayed at the media device. For example, in the context of providing navigation directions to a particular location, a warning indicator (e.g., a flashing red sign) may be displayed in order to alert a user (e.g., a deaf user) that the user is moving in a wrong direction with respect to the particular location.

In another particular embodiment, a computer-readable storage device stores instructions that, when executed by a processor, cause the processor to perform operations. The operations include receiving first image data captured (at a first time) by a first camera disposed within a first earpiece of an audio headset device and receiving second image data captured (at a second time) by the first camera disposed within the first earpiece. The operations further include identifying a movement (e.g., a head movement, a hand movement, a leg movement, or a combination thereof) based on the first image data and the second image data and sending an audio signal to the audio headset device that is determined based on the identified movement.

In another particular embodiment, an apparatus includes a processor and a memory. The memory is accessible to the processor and includes instructions executable by the processor to perform operations. The operations include receiving first and second image data captured by a first camera disposed within a first earpiece of an audio headset device. The operations further include receiving third and fourth image data captured by a second camera disposed within a second earpiece of the audio headset device. The operations include generating a first composite image (e.g., a stereoscopic image) based on the first image data captured by the first camera and the third image data captured by the second camera. The operations further include generating a second composite image (e.g., a second stereoscopic image) based on the second image data captured by the first camera and the fourth image data captured by the second camera. The operations also include identifying a movement (e.g., a head movement, a hand movement, a leg movement, or a combination thereof) based on the first composite image and the second composite image. The operations include determining whether the movement satisfies directional orientation criteria (e.g., for receiving navigation directions to a particular location) and sending an audio signal to the audio headset device that identifies whether the movement satisfies the directional orientation criteria.

FIG. 1 illustrates a particular embodiment of a system 100 for determining, based on information associated with a movement of an accessory device that is communicatively coupled to a media device (e.g., via a wired or a wireless interface), whether the accessory device satisfies accessory device orientation criteria. In the example of FIG. 1, the accessory device includes an audio headset device (e.g., headphones or earbuds), and a user 102 is shown wearing the audio headset device. The audio headset device may be communicatively coupled to an audio input (e.g., a mini-phono jack) of a media device 104 (e.g., a smartphone or other mobile computing device) via an audio interface 106.

When the audio headset device is communicatively coupled to the media device 104, signals may be communicated via one or more wires 108 between the media device 104 and a first earpiece 110 of the audio headset device and between the media device 104 and a second earpiece 112 of the audio headset device. While FIG. 1 illustrates a user's head, it will be appreciated that the information associated with movement of the accessory device (e.g., an audio headset device) may include head movement(s), hand movement(s), leg movement(s), or a combination thereof, as further described herein with respect to FIGS. 2-4.

In the particular embodiment illustrated in FIG. 1, the first earpiece 110 includes a speaker 114 and one or more sensors. In FIG. 1, the sensor(s) disposed within the first earpiece 110 include a first sensor 116 (e.g., a camera), a second sensor 118 (e.g., an accelerometer), and a third sensor 120 (e.g., a compass). In alternative embodiments, the first earpiece 110 may include more than three sensors or less than three sensors. FIG. 1 further illustrates that the second earpiece 112 includes a speaker 122 and one or more sensors. In FIG. 1, the sensors disposed within the second earpiece 112 include a first sensor 124 (e.g., a camera), a second sensor 126 (e.g., an accelerometer), and a third sensor 128 (e.g., a compass). In alternative embodiments, the second earpiece 112 may include more than three sensors or less than three sensors. An alternative or an additional example of sensors may include a sensor to receive local broadcast information, such as weather, traffic, or emergency conditions (that may alert a user to change a direction). Further, in some embodiments, the first earpiece 110 may include the speaker 114 and sensor(s), while the second earpiece 112 may include the speaker 122 but no sensors. In other embodiments, the second earpiece 112 may include the speaker 122 and sensor(s), while the first earpiece 110 may include the speaker 114 but no sensors.

In the particular embodiment illustrated in FIG. 1, the media device 104 includes an image module 130, a navigation module 132, an audio adjustment module 134, and a workout module 136. In some cases, the workout module 136 may correspond to a module for use in an indoor workout context (e.g., for hand/leg movements at a gym). That is, the workout module 136 may be used to capture and store information with respect to hand/leg movements in an indoor workout context (e.g., for use in providing guidance to a user with respect to particular workout movements). As another example, the workout module 136 may correspond to a module for use in an outdoor workout context (e.g., for leg movements such as jogging or cycling). That is, the workout module 136 may be used to capture and store information with respect to leg movements and associated music tracks that were played depending on a pace of leg movements (e.g., songs played when running, songs played when jogging, or songs played when walking, among other alternatives). The previously played music tracks may be replayed when leg movements are detected that correspond to a particular pace of movement. In alternative embodiments, the media device 104 may include more than four modules or less than four modules. In the example of FIG. 1, sensor data 138 may be communicated to the media device 104 from one or more of the sensors 114-120 disposed within the first earpiece 110, and sensor data 140 may be communicated to the media device 104 from one or more of the sensors 122-128 disposed within the second earpiece 112. FIG. 1 illustrates a particular example in which the sensor data 138 from the first earpiece 110 may include image data, and the sensor data 140 from the second earpiece 112 may include image data. As an example, the first sensor 116 disposed within the first earpiece 110 may be a camera that may capture image data and provide the image data to the media device 104 as the sensor data 138, and the first sensor 124 disposed within the second earpiece 112 may be a camera that may capture image data and provide the image data to the media device 104 as the sensor data 140.

FIG. 1 further illustrates that the media device 104 may output an audio signal 142 (e.g., a mono audio signal or a stereo audio signal) that may be communicated to the first earpiece 110, to the second earpiece 112, or a combination thereof. In the example illustrated in FIG. 1, from the perspective of the user 102, the first earpiece 110 is positioned in the user's right ear, while the second earpiece 112 is positioned in the user's left ear. The first earpiece 110 may correspond to a "right" earpiece of the audio headset device, and the second earpiece 112 may correspond to a "left" earpiece. Thus, in the case of a stereo signal, the audio signal 142 may include a first audio signal that is directed to the first earpiece 110 (e.g., a right-ear signal) and a second audio signal that is directed to the second earpiece 112 (e.g., a left-ear signal). Further, in the example of FIG. 1, the sensor data 138 captured by sensor(s) disposed within the first earpiece 110 (e.g., image data captured by the first sensor 116) may correspond to information (e.g., an image) representing a right-hand direction from the perspective of the user 102. The sensor data 140 captured by sensor(s) disposed within the second earpiece 112 (e.g., image data captured by the first sensor 124) may correspond to information (e.g., an image) representing a left-hand direction from the perspective of the user 102.

In some embodiments, the image module 130 of the media device 104 may be configured to determine whether the first earpiece 110 satisfies accessory device orientation criteria based on the sensor data 138 (e.g., first image data) received from the first earpiece 110. As another example, the image module 130 may be configured to determine whether the second earpiece 112 satisfies accessory device orientation criteria based on the sensor data 140 (e.g., second image data) received from the second earpiece 112. In a particular embodiment, the image module 130 may be configured to generate a composite image (e.g., a three-dimensional (3D) or stereoscopic image) based on the first image data received from the first earpiece 110 and the second image data received from the second earpiece 112. In this case, from the perspective of the user 102, the composite image may correspond to a panoramic view that includes image data captured by one camera (e.g., the first sensor 116) positioned in a right-hand direction and another camera (e.g., the first sensor 124) positioned in a left-hand direction. Thus, in the example of FIG. 1, the image module 130 of the media device 104 may be configured to determine, from the perspective of the user 102, a position of a user's head. As an illustrative, non-limiting example, the composite image may be used to detect obstacles that may block a user's path (e.g., traffic, a road closure, etc.) and alert the user in advance.

In some embodiments, the navigation module 132 may be operating at the media device 104 and may have determined navigation directions to a particular location (e.g., responsive to a request received from the user 102 for directions to the particular location). In some cases, the user 102 may request directions by speaking the request or providing location information via an input device of the media device 104 (e.g., a touchscreen), among other alternatives. In this illustrative example, the navigation module 132 may provide initial navigation directions to the particular location, and the audio signal 142 generated by the media device 104 may include updated navigation directions based on a position of the user's head (or hand or leg or a combination thereof) with respect to the particular location. To illustrate, the image module 130 may be configured to provide information to the navigation module 132 with respect to a position of the user's head (e.g., for the navigation module 132 to determine whether navigation directions that were previously provided to the user 102 with respect to the particular location are correct in light of the position of the user's head). In FIG. 1, the first earpiece 110 is positioned in the user's right ear from the perspective of the user 102, while the second earpiece 112 is positioned in the user's left ear from the perspective of the user 102. Thus, the information communicated from the image module 130 to the navigation module 132 may identify the sensor data 138 from the first earpiece 110 as corresponding to information from a right-hand perspective of the user 102 and may identify the sensor data 140 from the second earpiece 112 as corresponding to information from a left-hand perspective of the user 102. Based on the information, the navigation module 132 may be configured to generate the audio signal 142. In the event that the information indicates that the user's head is not correctly positioned for receiving navigation directions to a particular location, the audio signal 142 may include updated navigation directions (or updated road conditions or a traffic congestion report, among other alternatives).

As an illustrative, non-limiting example, the sensor data 138 from the first earpiece 110 may correspond to first image data, and the sensor data 140 from the second earpiece 112 may correspond to second image data. As described further herein with respect to FIG. 2, the media device 104 may process the image data received from one or more of the earpieces 110, 112 in order to determine head movement(s) of the user 102. The navigation module 132 may update navigation directions to a particular location based on the head movement(s) of the user 102 when the head movement(s) indicates that the user's head is not correctly positioned for receiving navigation directions to the particular location. Thus, in this example, the sensor data 138, 140 represents image data that is provided to the media device 104 and that may be used as input data to one or more modules (e.g., the image module 130 and the navigation module 132) of the media device 104.

As a further example, the sensor data 138 from the first earpiece 110 and/or the sensor data 140 from the second earpiece 112 may include accelerometer data measured by the second sensor 118 and/or the second sensor 126. As another illustrative example, the sensor data 138 from the first earpiece 110 and/or the sensor data 140 from the second earpiece 112 may include compass data from the third sensor 120 and/or the third sensor 128. In this case, the media device 104 may be configured to determine head movement(s) based on the accelerometer data and/or the compass data and may provide the information to the audio adjustment module 134 and/or to the workout module 136. To illustrate, as part of an audio application (e.g., a music player application), the audio adjustment module 134 may increase a volume of the audio signal 142 in response to an upward head movement and may decrease the volume in response to a downward head movement. As another example, a direction and/or a speed of a detected head movement may be determined based on the accelerometer data and/or the compass data and may be used to skip forward through audio tracks, to skip backward through audio tracks, to fast forward through audio tracks, and/or to fast forward backward through audio tracks, among other alternatives.

Thus, FIG. 1 illustrates that one or more sensors included in an accessory device (e.g., an audio headset device) may be used to provide sensor data to a media device. In some cases, the sensor data may be used to determine whether the accessory device satisfies accessory device orientation criteria. To illustrate, the media device 104 may generate a first audio signal in response to determining that the accessory device orientation criteria are not satisfied and may generate a second audio signal in response to determining that the accessory device orientation criteria are satisfied. To illustrate, the first audio signal may include accessory device re-orientation information (e.g., for receiving navigation directions to a particular location), while the second audio signal may include a confirmation of correct positioning (e.g., for receiving the navigation directions). In other cases, the sensor data may be provided to an audio application to be used to adjust a volume of an audio signal or to navigate between tracks, or the sensor data may be provided to a gaming application to perform particular player movements or other game play operations, among other alternatives.

Figure 2:
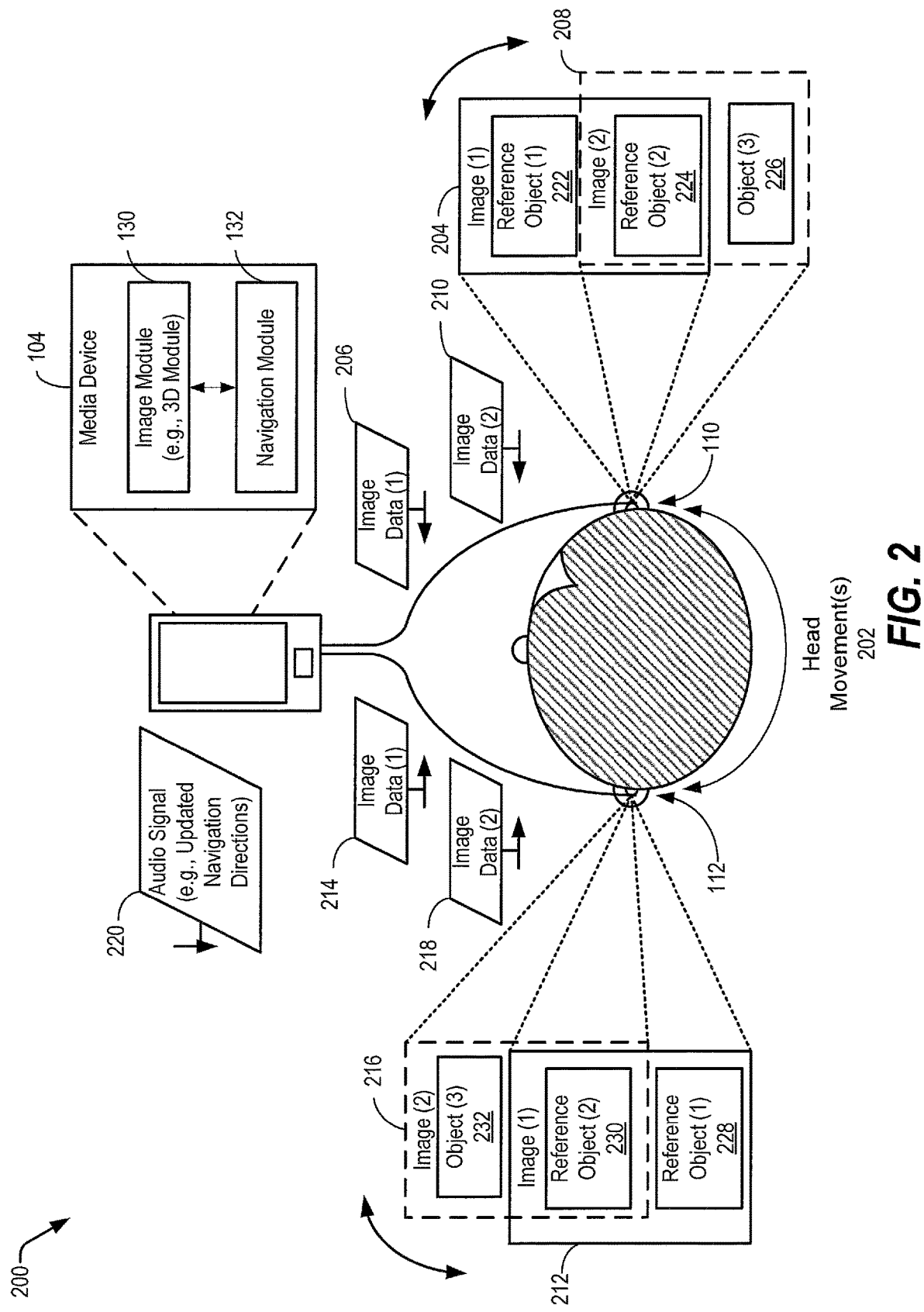
FIG. 2 is a diagram of a particular embodiment of a system for identifying head movements of a user based on image data captured by camera(s) associated with an accessory device (e.g., an audio headset device)

FIG. 2 illustrates a particular embodiment of a system 200 for identifying one or more head movements 202 of the user 102 based on image data captured by one or more cameras associated with an accessory device (e.g., an audio headset device) that is communicatively coupled to the media device 104 (e.g., via a wired interface). FIG. 2 illustrates one particular example in which image data is used to determine the head movement(s) 202. However, as described further herein with respect to FIGS. 3 and 4, the image data may be used to determine hand movement(s), leg movement(s), or any combination of head, hand, or leg movement(s). FIG. 2 illustrates that the media device 104 may generate an audio signal based on the identified head movement(s) 202. In a particular embodiment, in the context of navigation directions, the head movement(s) 202 may be used to determine whether a user's head is properly oriented for receiving navigation directions to a particular location. In the event that the user's head is not properly positioned, the media device 104 may provide updated navigation directions to the particular location.

In the example illustrated in FIG. 2, the camera 116 disposed within the first earpiece 110 is configured to capture a first image 204 (at a first time) and to provide information associated with the first image 204 to the media device 104 as first image data 206. The camera 116 disposed within the first earpiece 110 is further configured to capture a second image 208 (at a second time) and to provide information associated with the second image 208 to the media device 104 as second image data 210. The camera 124 disposed within the second earpiece 112 is configured to capture a first image 212 and to provide information associated with the first image 212 to the media device 104 as first image data 214. The camera 124 of the second earpiece 112 is further configured to capture a second image 216 and to provide information associated with the second image 216 to the media device 104 as second image data 218.

In some cases, the media device 104 may generate a first composite image (e.g., a stereoscopic image) based on the first image 204 captured by the camera 116 disposed within the first earpiece 110 and based on the first image 212 captured by the camera 124 disposed within the second earpiece 112. Further, in some cases, the media device 104 may generate a second composite image (e.g., a second stereoscopic image) based on the second image 208 captured by the camera 116 disposed within the first earpiece 110 and based on the second image 216 captured by the camera 124 disposed within the second earpiece 112. In a particular embodiment, the media device 104 may identify the head movement(s) 202 by comparing the first composite image to the second composite image.

In the illustrative, non-limiting example of FIG. 2, the head movement(s) 202 may include a movement of the user's head to the right (from the perspective of the user 102). In this case, the camera 116 disposed within the first earpiece 110 may capture the first image 204 at a first time and communicate the information associated with the first image 204 to the media device 104 as the first image data 206. Further, in some cases, the camera 124 disposed within the second earpiece 112 may capture the first image 212 at substantially the same time and provide the information associated with the first image 212 to the media device 104 as the first image data 214 (e.g., at substantially the same time as the first image data 206). While FIG. 2 illustrates one example in which the head movement(s) 202 include a movement of the user's head to the right, in alternative embodiments, the head movement(s) 202 may include a movement of the user's head to the right, to the left, in an upward direction, in a downward direction, or a combination thereof (from the perspective of the user 102). The image module 130 of the media device 104 may identify a movement of the user's head by comparing the first image data 206 from the first earpiece 110, the second image data 210 from the first earpiece 110, the first image data 214 from the second earpiece 112, the second image data 218 from the second earpiece 212, or any combination thereof. Based on the identified movement, the media device 104 is configured to generate an audio signal 220 and communicate the audio signal 220 to one or more of the earpieces 110, 112.

FIG. 2 illustrates a particular embodiment in which the image module 130 of the media device 104 may determine a movement (e.g., of the user's head) based on one or more reference objects (e.g., trees, stationary automobiles, buildings, other stationary objects, etc.) in one or more of the images. FIG. 2 illustrates a simplified example in which the first image 204 captured by the camera 116 disposed within the first earpiece 110 includes a first reference object 222 and a second reference object 224, while the second image 208 captured by the camera 116 includes the second reference object 224 and a third object 226. In one embodiment, the image module 130 may identify the head movement(s) 202 as a movement to the right (from the perspective of the user 102) based on the absence of the first reference object 222 from the second image 208. As another example, the image module 130 may identify a direction of the head movement(s) 202 based on movement of the second reference object 224 from a first location in the first image 204 (e.g., first X, Y, and/or Z coordinates) with respect to a second location in the second image 206 (e.g., second X, Y, and/or Z coordinates). As a further example, the image module 130 may identify a direction of the head movement(s) 202 based on the absence of the third object 226 in the first image 204 and the presence of the third object 226 in the second image 208. In alternative embodiments, alternative numbers of reference objects may appear in one or more of the images captured by the camera 116 disposed within the first earpiece 110.

In the example illustrated in FIG. 2, the first image 212 captured by the camera 124 disposed within the second earpiece 112 includes a first reference object 228 and a second reference object 230, while the second image 216 captured by the camera 124 includes the second reference object 230 and a third object 232. In one embodiment, the image module 130 may identify the head movement(s) 202 as a movement to the right (from the perspective of the user 102) based on the absence of the first reference object 228 from the second image 216. As another example, the image module 130 may identify a direction of the head movement(s) 202 based on movement of the second reference object 230 from a first location in the first image 212 (e.g., first X, Y, and/or Z coordinates) with respect to a second location in the second image 216 (e.g., second X, Y, and/or Z coordinates). As a further example, the image module 130 may identify a direction of the head movement(s) 202 based on the absence of the third object 232 in the first image 212 and the presence of the third object 232 in the second image 216. In alternative embodiments, alternative numbers of reference objects may appear in one or more of the images captured by the camera 124 disposed within the second earpiece 112.

In some cases, the navigation module 132 may be configured to determine whether to provide updated navigation directions to the user 102 (e.g., via the audio signal 220 or via a visual indication on a display of the media device 104). As an illustrative, non-limiting example, the navigation module 132 may be executing at the media device 104 and may provide navigation directions to a coffee shop that may be located on a left side of a street (from the perspective of the user 102). In this case, when the image module identifies that the head movement(s) 202 indicate that the user 102 is looking right (rather than left), the media device 104 may generate the audio signal 220 with updated navigation directions, such as "No, not that direction, look the other way." By contrast, in some embodiments, if the head movement(s) 202 indicates that the user is looking left (from the perspective of the user 102), the media device 104 may generate the audio signal 220 to provide confirmation that the user's head is correctly positioned for receiving the navigation directions. To illustrate, the media device 104 may generate an audio signal, such as "Yes, right down that street, you should see it on the left side of the road about 300 yards away."

Thus, FIG. 2 illustrates a particular example in which camera(s) associated with earpiece(s) of an audio headset device may provide image data to the media device 104 that may be used to determine head movement(s) based on the presence or absence of reference object(s) in images captured by the camera(s). In some cases, the head movement(s) may be used to provide updated navigation directions when the image data captured by the camera(s) indicates that a user's head is incorrectly positioned to receive navigation directions to a particular location. In this case, the media device may generate updated navigation directions that may prompt the user to move her head to a different orientation. Alternatively, the head movement(s) may be used to confirm that the user's head is properly positioned to receive navigation directions to a particular location, and in some cases the media device may generate a confirmation message to notify the user that her head is correctly positioned to receive the navigation directions. In other cases, the image data may be provided to an audio application to be used to adjust a volume of an audio signal or to navigate between tracks, or the image data may be provided to a gaming application to perform particular player movements or other game play operations, among other alternatives.

Figure 3:
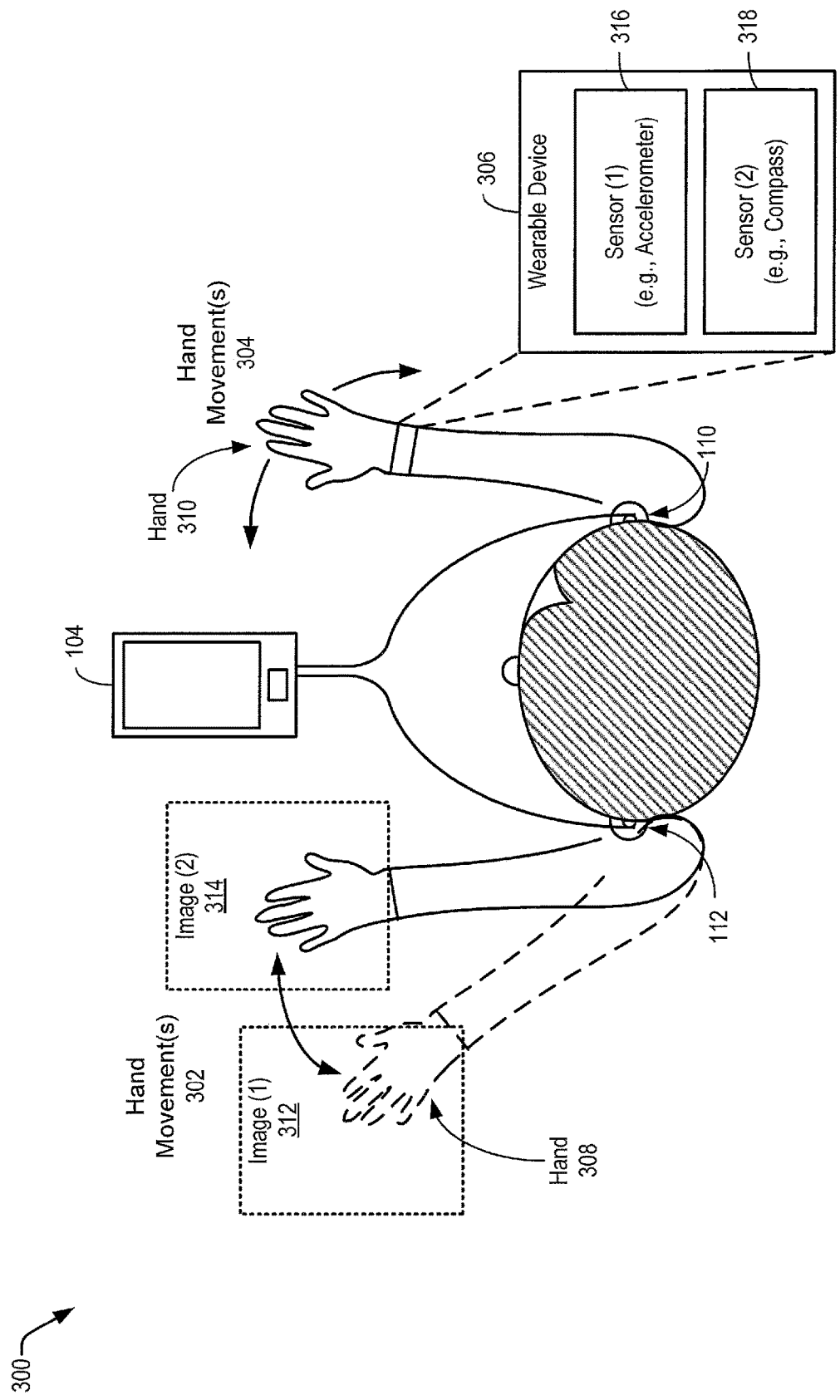
FIG. 3 is a diagram of a particular embodiment of a system for identifying hand movements of a user based on image data captured by camera(s) associated with an accessory device (e.g., an audio headset device)

FIG. 3 illustrates a particular embodiment of a system 300 for identifying hand movement(s) 302 based on image data captured by one or more cameras associated with an accessory device (e.g., an audio headset device) that is communicatively coupled to the media device 104 (e.g., via a wired interface). FIG. 3 illustrates that hand movement(s) 304 of the user 102 may also be identified based on information received from another device (e.g., a wearable device 306). FIG. 3 illustrates one particular example in which image data and/or sensor data from the wearable device 306 is used to determine the hand movement(s) 302 and/or the hand movement(s) 304. However, as described further herein with respect to FIGS. 2 and 4, the image data and/or sensor data from the wearable device 306 may be used to determine head movement(s), leg movement(s), or any combination of head, hand, or leg movement(s).

In the particular embodiment illustrated in FIG. 3, the camera 116 disposed within the second earpiece 112 is configured to identify the hand movement(s) 302 associated with a first hand 308 of the user 102 (e.g., a left hand from the perspective of the user 102). In FIG. 3, the wearable device 306 includes one or more sensors to identify the hand movement(s) 304 associated with a second hand 310 of the user 102 (e.g., a right hand from the perspective of the user 102). However, it will be appreciated that the example of FIG. 3 is for illustrative purposes and that in alternative embodiments, the camera 124 disposed within the first earpiece 110 may be used to identify the hand movement(s) 304 associated with the second hand 310. Further, the wearable device 306 may be associated with the first hand 308 rather than the second hand 310 and may be used to track the hand movement(s) 302 of the first hand 308.

In the example of FIG. 3, the camera 124 disposed within the second earpiece 112 is configured to capture a first image 312 and to provide information associated with the first image 312 to the media device 104 (e.g., as first image data). The camera 124 disposed within the second earpiece 112 is further configured to capture a second image 314 and to provide information associated with the second image 314 to the media device 104 (e.g., as second image data). FIG. 3 illustrates a particular example in which the hand movement(s) 302 associated with the first hand 308 represent a movement in a right-hand direction from the perspective of the user 102. In some cases, the first hand 308 may be used as a reference object to determine the hand movement(s) 302. For example, the image module 130 of the media device 104 may identify a direction of the hand movement(s) 302 based on movement of the first hand 308 from a first location in the first image 312 (e.g., first X, Y, and/or Z coordinates) with respect to a second location in the second image 314 (e.g., second X, Y, and/or Z coordinates).

In some cases, the navigation module 132 of the media device 104 may be configured to determine whether to provide updated navigation directions based on the identified hand movement(s) 302. As an illustrative, non-limiting example, the media device 104 may provide navigation directions to a gas station that may be located on a right side of a street (from the perspective of the user 102). To illustrate, in the example of FIG. 3, the image module 130 may identify that the hand movement(s) 302 indicate that the user 102 is pointing right (rather than left) in response to receiving navigation directions to the gas station. Accordingly, in some embodiments, the media device 104 may generate an audio signal to provide confirmation that the user's hand is pointing to a correct side of the street. To illustrate, the media device 104 may generate an audio signal, such as "Yes, the gas station is on the right side of the road about 200 yards away." By contrast, in some embodiments, if the hand movement(s) 302 indicates that the user 102 is pointing left (from the perspective of the user 102) in response to receiving navigation directions to the gas station, the media device 104 may generate an audio signal with updated navigation directions. To illustrate, the media device 104 may generate an audio signal, such as "No, not on that side of the street, the gas station is located on the other side of the street."

FIG. 3 illustrates a particular embodiment in which the wearable device 306 includes a first sensor 316 (e.g., an accelerometer) and a second sensor 318 (e.g., a compass). However, it will be appreciated that in alternative embodiments more than two sensors or less than two sensors may be used. In some cases, the wearable device 306 may communicate sensor data to the media device 104 via a wireless signal (e.g., a Wi-Fi signal or a near-field communication signal). The media device 104 may be configured to determine the hand movement(s) 304 based on accelerometer data received from the first sensor 316 of the wearable device 306 and/or compass data received from the second sensor 318 of the wearable device 306. In some cases, the media device 104 may provide information associated with the hand movement(s) 304 to the navigation module 132, the audio adjustment module 134, and/or the workout module 136. With respect to navigation, the navigation module 132 may provide updated navigation directions and/or a confirmation of a particular direction based on the hand movement(s) 304 in a manner similar to that described above with respect to the hand movement(s) 302.

As another example, the audio adjustment module 134 may increase a volume of the audio signal 142 in response to an upward hand movement and may decrease the volume in response to a downward hand movement. As other examples, a direction and/or a speed of a detected hand movement may be used to skip forward through audio tracks, to skip backward through audio tracks, to fast forward through audio tracks, to fast forward backward through audio tracks, among other alternatives. To illustrate, a one-time short-distance quick hand movement to the right may correspond to skipping forward through audio tracks, while a one-time short-distance quick hand movement to the left may correspond to skipping backward through audio tracks. As another example, a two-time long-distance quick hand movement to the right may correspond to fast forwarding through audio tracks, while a two-time long-distance quick hand movement to the left may correspond to fast forwarding backward through audio tracks. As a further example, a one-time long-distance hand movement to the right or to the left may correspond to stopping or pausing a search through audio tracks. An up or down hand movement may correspond to playing or accepting an option (e.g., a song), while a left or right hand movement may correspond to cancelling an option. In an example, head/hand/foot movements for gesture control may be distinguished from normal movements during walking/jogging/running by virtue of being sudden or unexpected instead of rhythmic or expected. Alternatively, a user may say a specific phrase, make a specific movement, or otherwise indicate that movement that follows is a gesture control input. In a particular embodiment, the hand movement(s) 302 may be used as input data to a gaming application. As an illustrative, non-limiting example, a particular hand movement may correspond to a particular action in a game. For example, when the hand movement(s) 302 includes upward hand movement(s), a first action (e.g., a punch in a combat game or reloading a weapon in a first-person shooter game) may be executed. As another example, when the hand movement(s) 302 includes left or right movement(s), other actions (e.g., scrolling left or right in a menu of selectable options) may be executed. As a further example, when the hand movement(s) 302 include downward hand movement(s), another action (e.g., selecting one of the selectable option from the menu of selectable options) may be executed. As another example, when the gaming application includes music (e.g., a guitar playing game or a dancing game), the hand movement(s) 302 may be used to determine whether body movement(s) are synchronized with the music. To illustrate, a user's score in the game may increase in response to detecting movement such as a quick twist when a music volume increases or the music is relatively fast-paced (e.g., rock music). As another example, the user's score may increase in response to detecting movement such as slow motion when the music is relatively slow-paced.

In some cases, the wearable device 306 may be used to provide command(s) to the media device 104 when it may be inconvenient for the user 102 to provide input via the media device 104 itself (e.g., when the user is walking, jogging, or running). Accordingly, the accelerometer data and/or the compass data from the wearable device 306 may provide an alternative option for providing command(s) to the media device 104. As illustrative examples, a very quick hand movement may be used to access a rock/rap/fast-paced song list, a quick hand movement may be used to access a light rock song list, a slow hand movement may be used to access a light rock song list, and a very slow hand movement may be used to access a classical/slow-paced song list.

Thus, FIG. 3 illustrates a particular example in which camera(s) associated with earpiece(s) of an audio headset device may be used to determine hand movement(s). In some cases, the hand movement(s) may be used to provide updated navigation directions when the image data captured by the camera(s) indicates that a user's hand is pointing in a wrong direction with respect to a particular location. In this case, the media device may generate an audio signal that may indicate that the user is pointing in the wrong direction. Alternatively, the hand movement(s) may be used to confirm that the user's hand is pointing in a correct direction with respect to a particular location. FIG. 3 further illustrates that, in some cases, a wearable device may include sensor(s) that may be used to provide information to a media device that may be used to identify hand movement(s).

Figure 4:
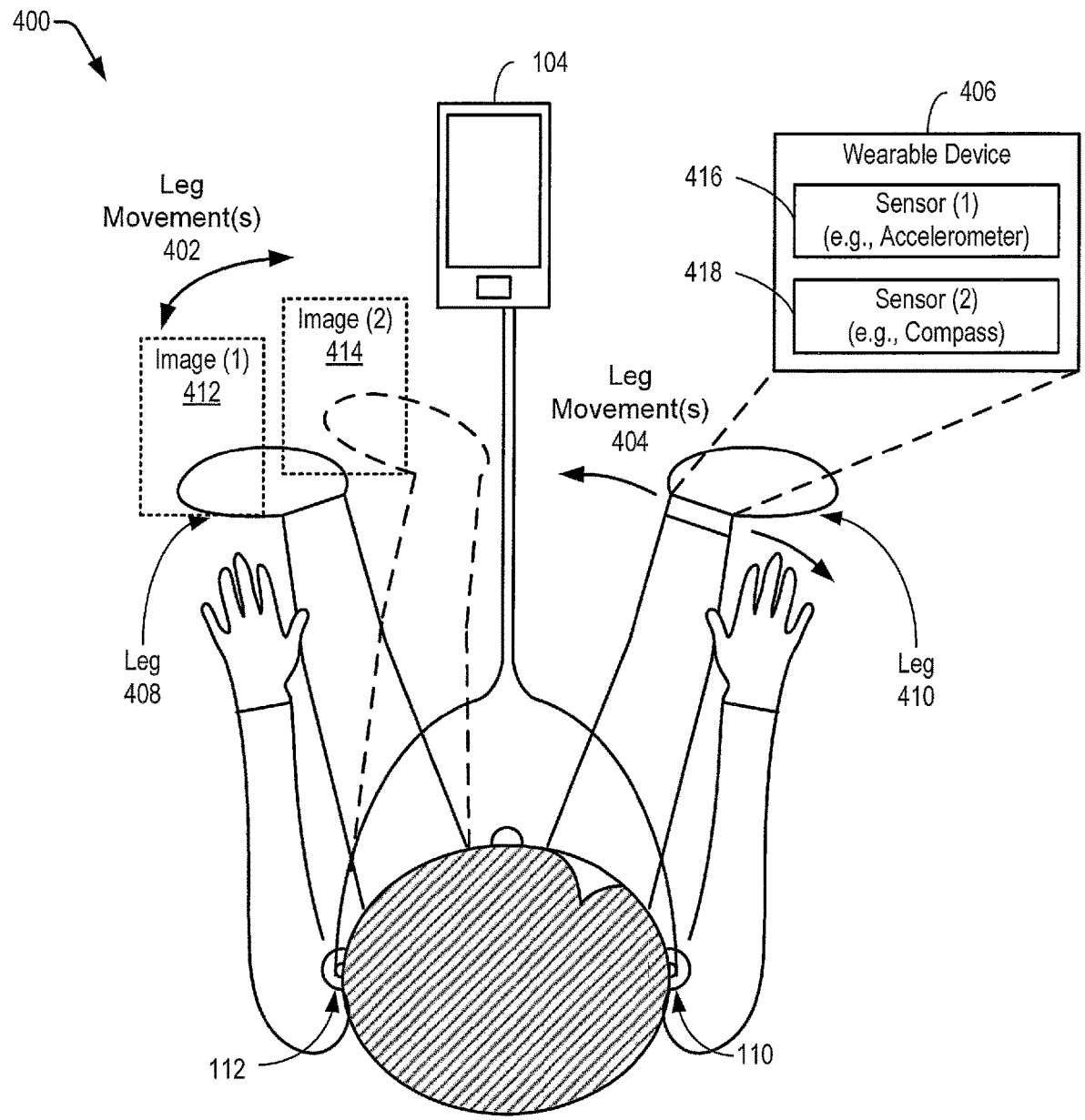
FIG. 4 is a diagram of a particular embodiment of a system for identifying leg movements of a user based on image data captured by camera(s) associated with an accessory device (e.g., an audio headset device)

FIG. 4 illustrates a particular embodiment of a system 400 for identifying leg movement(s) 402 based on image data captured by one or more cameras associated with an accessory device (e.g., an audio headset device) that is communicatively coupled to the media device 104 (e.g., via a wired interface). FIG. 4 illustrates that leg movement(s) 404 may also be identified based on information received from another device (e.g., a wearable device 406). FIG. 4 illustrates one particular example in which image data and/or sensor data from the wearable device 406 is used to determine the leg movement(s) 402 and/or the leg movement(s) 404. However, as described further herein with respect to FIGS. 2 and 3, the image data and/or sensor data from the wearable device 406 may be used to determine head movement(s), hand movement(s), or any combination of head, hand, or leg movement(s).

In the particular embodiment illustrated in FIG. 4, the camera 116 disposed within the second earpiece 112 is configured to identify the leg movement(s) 402 associated with a first leg 408 of the user 102 (e.g., a left leg from the perspective of the user 102). In FIG. 4, the wearable device 406 includes one or more sensors to identify the leg movement(s) 404 associated with a second leg 410 of the user 102 (e.g., a right leg from the perspective of the user 102). However, it will be appreciated that the example of FIG. 4 is for illustrative purposes only and that in alternative embodiments, the camera 124 disposed within the first earpiece 110 may be used to identify the leg movement(s)

404 associated with the second leg 410. Further, the wearable device 406 may be associated with the first leg 408 rather than the second leg 410 and may be used to track the leg movement(s) 402 of the first leg 408. Alternatively, another wearable device (not shown) may be associated with the first leg 408, and the other wearable device may be used to track the leg movement(s) 402 of the first leg 408, and the wearable device 406 may be used to track the leg movement(s) 404 of the second leg 410.

In the example of FIG. 4, the camera 124 disposed within the second earpiece 112 is configured to capture a first image 412 and to provide information associated with the first image 412 to the media device 104 (e.g., as first image data). The camera 124 disposed within the second earpiece 112 is further configured to capture a second image 414 and to provide information associated with the second image 414 to the media device 104 (e.g., as second image data). FIG. 4 illustrates a particular example in which the leg movement(s) 402 associated with the first leg 408 represent a movement in a right-hand direction from the perspective of the user 102. In some cases, the leg 408 may be used as a reference object to determine the leg movement(s) 402. For example, the image module 130 of the media device 104 may identify a direction of the leg movement(s) 402 based on movement of the first leg 408 from a first location in the first image 412 (e.g., first X, Y, and/or Z coordinates) with respect to a second location in the second image 414 (e.g., second X, Y, and/or Z coordinates).

In some cases, the navigation module 132 of the media device 104 may be configured to determine whether to provide updated navigation directions based on the identified leg movement(s) 402. As an illustrative, non-limiting example, the media device 104 may provide navigation directions to a gas station that may be located on a right side of a street (from the perspective of the user 102). To illustrate, referring to the example of FIG. 4, the image module 130 may identify (e.g., based on a change of position of the first leg 408 between the first image 412 and the second image 414) that the leg movement(s) 402 indicate that the user 102 is moving (e.g., walking) to the right (rather than left). Accordingly, in some embodiments, the media device 104 may generate an audio signal to provide confirmation that the user is walking toward a correct side of the street (e.g., when the user 102 is crossing or is about to cross the street). To illustrate, the media device 104 may generate an audio signal, such as "Yes, the gas station is on the other side of this street about 200 yards away." By contrast, in some embodiments, if the leg movement(s) 402 indicates that the user 102 is moving left (from the perspective of the user 102), the media device 104 may generate an audio signal with updated navigation directions. To illustrate, the media device 104 may generate an audio signal, such as "No, not on that side of the street, the gas station is located on the other side of the street."

FIG. 4 illustrates a particular embodiment in which the wearable device 406 includes a first sensor 416 (e.g., an accelerometer) and a second sensor 418 (e.g., a compass). However, it will be appreciated that in alternative embodiments more than two sensors or less than two sensors may be used. In some cases, the wearable device 406 may communicate sensor data to the media device 104 via a wireless signal (e.g., a Wi-Fi signal or a near-field communication signal). The media device 104 may be configured to determine the leg movement(s) 404 based on accelerometer data received from the first sensor 416 of the wearable device 406 and/or compass data received from the second sensor 418 of the wearable device 406. In some cases, the media device 104 may provide information associated with the leg movement(s) 404 to the navigation module 132, the audio adjustment module 134, and/or the workout module 136. With respect to navigation, the navigation module 132 may provide updated navigation directions and/or a confirmation of a particular direction based on the leg movement(s) 404 in a manner similar to that described above with respect to the leg movement(s) 402.

As another example, the user 102 may initiate an application (e.g., an audio application or a gaming application) via a user interface of the media device 104. In response, the media device 104 may initiate an application that may compare the leg movement(s) 404 to previously identified types of leg movements, such as walking, jogging, running, or kicking, among other alternatives. As a first illustrative example, the media device 104 may store information that may correspond to a walking gait, a jogging gait, a running gait, and one or more types of kick movements. To illustrate, in the context of an audio application, the audio adjustment module 134 may increase a volume of the audio signal 142 in response to an upward leg movement and may decrease the volume in response to a downward leg movement. As other examples, a direction and/or a speed of a detected leg movement may be used to skip forward through audio tracks, to skip backward through audio tracks, to fast forward through audio tracks, to fast forward backward through audio tracks, among other alternatives. To illustrate, a one-time short-distance quick leg movement to the right may correspond to skipping forward through audio tracks, while a one-time short-distance quick leg movement to the left may correspond to skipping backward through audio tracks. As another example, a two-time long-distance quick leg movement to the right may correspond to fast forwarding through audio tracks, while a two-time long-distance quick leg movement to the left may correspond to fast forwarding backward through audio tracks. As a further example, a one-time long-distance leg movement to the right or to the left may correspond to stopping or pausing a search through audio tracks. An up or down leg movement may correspond to playing or accepting an option (e.g., a song), while a left or right leg movement may correspond to cancelling an option. Further, the media device 104 may store information associated with music tracks that were played depending on a pace of leg movements (e.g., songs played when running, songs played when jogging, or songs played when walking, among other alternatives). In this case, the workout module 136 (see FIG. 1) may replay particular music tracks when the leg movement(s) 404 correspond to a particular pace of movement.

As another illustrative example, in the context of a gaming application, the leg movement(s) 402 may be provided as input data to a gaming application. As an illustrative, non-limiting example, a particular leg movement may correspond to a particular action in a game. For example, when the leg movement(s) 402 includes upward leg movement(s), a first action (e.g., a kick in a combat game) may be executed. As another example, when the leg movement(s) 402 includes left or right movement(s), other actions (e.g., a leg sweep to the left or to the right in a combat game) may be executed. As a further example, when the leg movement(s) 402 include downward leg movement(s), another action (e.g., moving a player avatar backward within a game) may be executed. As another example, when the gaming application includes music (e.g., a guitar playing game or a dancing game), the leg movement(s) 402 may be used to determine whether body movement(s) are synchronized with the music. To illustrate, a user's score in the game may increase in response to detecting movement such as a quick twist when a music volume increases or the music is relatively fast-paced (e.g., rock music). As another example, the user's score may increase in response to detecting movement such as slow motion when the music is relatively slow-paced.

In some cases, the wearable device 406 may be used to provide command(s) to the media device 104 when it may be inconvenient for the user 102 to provide input via the media device 104 itself (e.g., when the user is walking, jogging, or running). Accordingly, the accelerometer data and/or the compass data from the wearable device 406 may provide an alternative option for providing command(s) to the media device 104. As illustrative examples, a very quick leg movement (e.g., running) may be used to access a rock/rap/fast-paced song list, a quick leg movement (e.g., jogging) may be used to access a light rock song list, a slow leg movement (e.g., walking) may be used to access a light rock song list, and a very slow leg movement (e.g., walking slowly) may be used to access a classical/slow-paced song list.

Thus, FIG. 4 illustrates a particular example in which camera(s) associated with earpiece(s) of an audio headset device may be used to determine leg movement(s). In some cases, the leg movement(s) may be used to provide updated navigation directions when the image data captured by the camera(s) indicates that a user is moving in a wrong direction with respect to a particular location. In this case, the media device may generate an audio signal that may indicate that the user is moving in the wrong direction. Alternatively, the leg movement(s) may be used to confirm that the user is moving in a correct direction with respect to a particular location. FIG. 4 further illustrates that, in some cases, a wearable device may include sensor(s) that may be used to provide information to a media device that may be used to identify leg movement(s).

Figure 5:
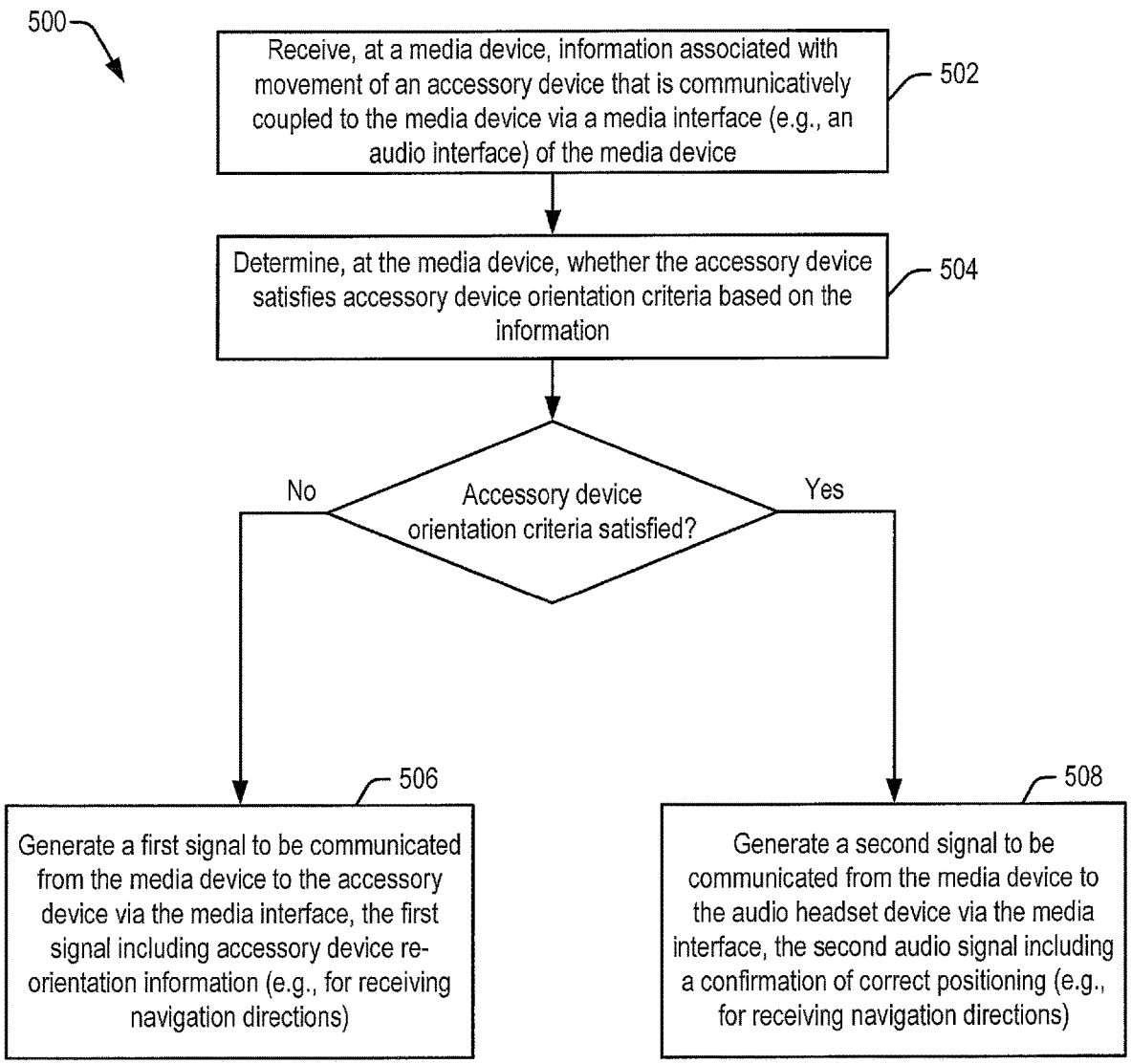
FIG. 5 is a flowchart that illustrates a particular embodiment of a method to determine, based on information associated with a movement of an accessory device (that is communicatively coupled to a media device via a wired interface) whether the accessory device satisfies accessory device orientation criteria.

FIG. 5 illustrates a particular embodiment of a method 500 to determine, in the context of providing navigation directions, whether an accessory device satisfies accessory device orientation criteria based on information associated with a movement of the accessory device, where the accessory device is communicatively coupled to a media device (e.g., via a wired interface). In the example of FIG. 5, the media device may generate a first signal (e.g., a first audio signal) in response to determining that the accessory device orientation criteria are not satisfied and may generate a second signal (e.g., a second audio signal) in response to determining that the accessory device orientation criteria are satisfied. To illustrate, the first audio signal may include accessory device re-orientation information (e.g., for receiving navigation directions to a particular location), while the second audio signal may include a confirmation of correct positioning (e.g., for receiving the navigation directions).

The method 500 includes receiving information associated with movement of an accessory device at a media device, at 502. The accessory device is communicatively coupled to the media device (such as via a wired or wireless interface of the media device). For example, referring to FIG. 1, the media device 104 may receive the sensor data 138 from the first earpiece 110 of an audio headset device and may receive the sensor data 140 from the second earpiece 112 of the audio headset device. The first earpiece 110 and the second earpiece 112 may be communicatively coupled to the media device 104 via the wires 108 and the audio interface 106. For example, the audio interface 106 of the audio headset device may be coupled to the media device 104 via a mini-phone jack of the media device 104.

The method 500 further includes determining, at the media device, whether the accessory device satisfies accessory device orientation criteria based on the information, at 504. As an illustrative example, referring to FIG. 1, the accessory device may correspond to the first sensor 116 (e.g., a camera) of the first earpiece 110 or the first sensor 124 of the second earpiece 112. Thus, the sensor data 138 received from the first earpiece 110 may include first image data and the sensor data 140 from the second earpiece 112 may include second image data. In the example illustrated in FIG. 1, from the perspective of the user 102, the first earpiece 110 is positioned in the user's right ear, while the second earpiece 112 is positioned in the user's left ear. That is, the first image data captured by the camera 116 in the first earpiece 110 may correspond to a view in a right-hand direction from the perspective of the user 102, while the second image data captured by the camera 124 may correspond to a view in a left-hand direction from the perspective of the user 102.

As one example, the image module 130 of the media device 104 may determine whether the first earpiece 110 satisfies accessory device orientation criteria based on the sensor data 138 (e.g., first image data) received from the first earpiece 110. As another example, the image module 130 may determine whether the second earpiece 112 satisfies accessory device orientation criteria based on the sensor data 140 (e.g., second image data) received from the second earpiece 112. In a particular embodiment, the image module 130 may generate a composite image (e.g., a 3D image) based on the first image data and the second image data. In this case, from the perspective of the user 102, the composite image may correspond to a panoramic view that includes image data captured by one camera positioned in a right-hand direction and another camera positioned in a left-hand direction. Thus, in the example of FIG. 1, the image module 130 of the media device 104 may determine, from the perspective of the user 102, a position of a user's head for receiving navigation directions.

In response to determining that the accessory device orientation criteria is not satisfied, the method 500 may include generating a first signal (e.g., a first audio signal) to be communicated from the media device to the accessory device via the wired or a wireless interface, at 506. The first audio signal may include accessory device re-orientation criteria (e.g., for receiving navigation directions). In alternative embodiments, information may be visually communicated to the user (e.g., via a display of the media device). In the particular embodiment illustrated in FIG. 5, the method 500 includes generating a second signal (e.g., a second audio signal) to be communicated from the media device to the accessory device via the wired or a wireless interface in response to determining that the accessory device orientation criteria is satisfied, at 508. To illustrate, the second audio signal may include a confirmation of correct positioning of the accessory device (e.g., for receiving navigation directions). In alternative embodiments, information may be visually communicated to the user (e.g., via a display of the media device).

As a first illustrative example, referring to FIG. 1, the image module 130 may provide information to the navigation module 132 with respect to a position of the user's head for receiving navigation directions. Based on the information, the navigation module 132 may generate the audio signal 142. In the event that the information indicates that the user's head is not correctly positioned for receiving navigation directions to a particular location, the audio signal 142 may include updated navigation directions. In some cases, in the event that the information indicates that the user's head is correctly positioned for receiving the navigation directions to the particular location, the audio signal 142 may include a confirmation that the user's head is correctly positioned. Alternatively, the navigation module 132 may refrain from providing an audio signal in the event that the user's head is correctly positioned for receiving the navigation directions to the particular location.

Thus, FIG. 5 illustrates that one or more sensors included in an accessory device (e.g., an audio headset device) may provide movement information to a media device. The media device may determine whether the accessory device satisfies accessory device orientation criteria and may generate an audio signal based on whether the accessory device orientation criteria are satisfied. To illustrate, when the orientation criteria are not satisfied, the audio signal may include accessory device re-orientation information (e.g., for receiving navigation directions to a particular location).

Figure 6:
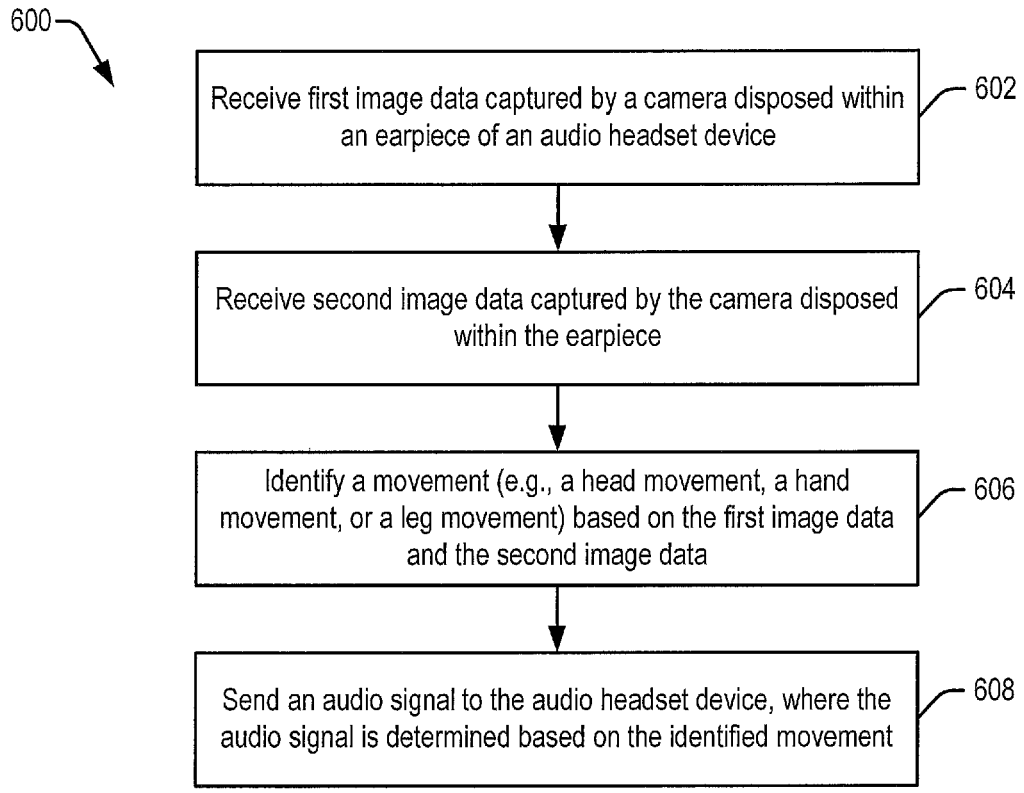
FIG. 6 is a flowchart that illustrates a particular embodiment of a method to identify a movement (e.g., a head movement, a hand movement, or a leg movement) based on image data captured by a camera disposed within an earpiece of an audio headset device and sending an audio signal to the audio headset device based on the identified movement.

FIG. 6 illustrates a particular embodiment of a method 600 to identify a movement (e.g., a head movement, a hand movement, or a leg movement) based on image data captured by a camera disposed within an earpiece of an audio headset device and sending an audio signal to the audio headset device based on the identified movement.

The method 600 includes receiving first image data captured by a camera disposed within an earpiece of an audio headset device, at 602. As a first illustrative example, FIG. 2 illustrates a particular embodiment in which the movement includes one or more head movements 202. In FIG. 2, the first image data 206 captured by the camera disposed within the first earpiece 110 may correspond to the first image 204. Alternatively, the first image data 214 captured by the camera disposed within the second earpiece 112 may correspond to the first image 212. As a second illustrative example, FIG. 3 illustrates a particular embodiment in which the movement includes one or more hand movements 302. In FIG. 3, image data captured by the camera disposed within the second earpiece 112 may correspond to the first image 312. As a third illustrative example, FIG. 4 illustrates a particular embodiment in which the movement includes one or more leg movements 402. In FIG. 4, image data captured by the camera disposed within the second earpiece 112 may correspond to the first image 412.

The method 600 includes receiving second image data captured by the camera disposed within the earpiece of the audio headset device, at 604. As a first illustrative example, FIG. 2 illustrates a particular embodiment in which the movement includes one or more head movements 202. In FIG. 2, the second image data 210 captured by the camera disposed within the first earpiece 110 may correspond to the second image 208. Alternatively, the second image data 218 captured by the camera disposed within the second earpiece 112 may correspond to the second image 216. As a second illustrative example, FIG. 3 illustrates a particular embodiment in which the movement includes one or more hand movements 306. In FIG. 3, image data captured by the camera disposed within the second earpiece 112 may correspond to the second image 314. As a third illustrative example, FIG. 4 illustrates a particular embodiment in which the movement includes one or more leg movements 402. In FIG. 4, image data captured by the camera disposed within the second earpiece 112 may correspond to the second image 414.

The method 600 further includes identifying a movement (e.g., a head movement, a hand movement, or a leg movement) based on the first image data and the second image data, at 606.

As a first illustrative example, FIG. 2 illustrates a particular embodiment in which the movement includes one or more head movements 202. In FIG. 2, the one or more head movements 202 may be identified based on the first image data 206 and the second image data 210 captured by the camera disposed within the first earpiece 110. In this case, the head movement(s) 202 may be identified by comparing a position of one or more objects (e.g., the first reference object 222, the second reference object 224, and/or the third object 226) in the first image 204 and/or the second image 208. Alternatively, the one or more head movements 202 may be identified based on the first image data 214 and the second image data 218 captured by the camera disposed within the second earpiece 112. In this case, the head movement(s) 202 may be identified by comparing a position of one or more objects (e.g., the first reference object 228, the second reference object 230, and/or the third object 232) in the first image 212 and/or the second image 216.

As a second illustrative example, FIG. 3 illustrates a particular embodiment in which the movement includes one or more hand movements 302. In FIG. 3, the one or more hand movements 302 may be identified based on the first image data 312 and the second image data 314 captured by the camera disposed within the second earpiece 112. As a third illustrative example, FIG. 4 illustrates a particular embodiment in which the movement includes one or more leg movements 402. In FIG. 4, image data captured by the camera disposed within the second earpiece 112 may correspond to the first image 412. In FIG. 4, the one or more leg movements 402 may be identified based on the first image data 412 and the second image data 414 captured by the camera disposed within the second earpiece 112.

The method 600 also includes sending an audio signal to the audio headset device, at 608. The audio signal is determined based on the identified movement. For example, referring to FIG. 2, the media device 104 may send the audio signal 220 to the first earpiece 110, to the second earpiece 112, or a combination thereof. Similarly, referring to FIGS. 3 and 4, the media device 104 may send an audio signal to the first earpiece 110, to the second earpiece 112, or a combination thereof Thus, FIG. 6 illustrates a method to identify a movement (e.g., a head movement, a hand movement, or a leg movement) based on image data captured by a camera disposed within an earpiece of an audio headset device and sending an audio signal to the audio headset device based on the identified movement.

Figure 7:
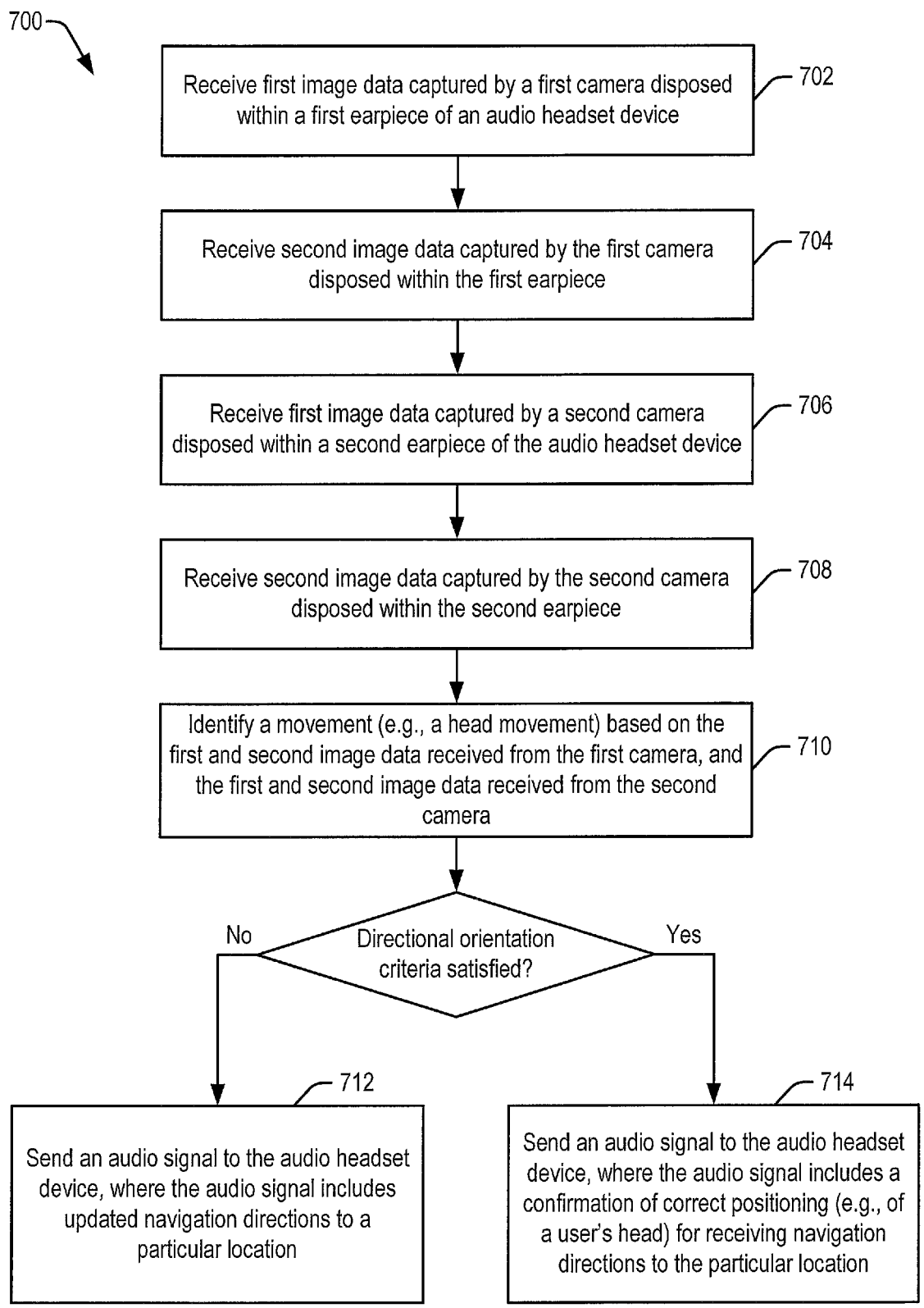
FIG. 7 is a flowchart that illustrates a particular embodiment of a method to identify a movement (e.g., a head movement) based on image data captured by cameras disposed within earpieces of an audio headset device and sending an audio signal to the audio headset device based on the identified movement.

FIG. 7 illustrates a particular embodiment of a method 700 to identify a movement (e.g., a head movement in the context of providing navigation directions) based on image data captured by cameras disposed within earpieces of an audio headset device and sending an audio signal to the audio headset device based on the identified movement. In FIG. 7, the audio signal may include updated navigation directions to a particular location when directional orientation criteria (e.g., head orientation criteria) are not satisfied. FIG. 7 illustrates that the audio signal may include a confirmation of correct positioning (e.g., head orientation, hand orientation, or leg orientation) for receiving navigation directions to the particular location when the directional orientation criteria are satisfied.

The method 700 includes receiving first image data captured by a first camera disposed within a first earpiece of an audio headset device, at 702. For example, referring to FIG. 2, the media device 104 may receive the first image data 206 captured by the camera 116 disposed within the first earpiece 110. The method 700 includes receiving second image data captured by the camera disposed within the first earpiece, at 704. For example, referring to FIG. 2, the media device 104 may receive the second image data 210 captured by the camera 116 disposed within the first earpiece 110.

The method 700 further includes receiving third image data captured by a camera disposed within a second earpiece of the audio headset device, at 706. For example, referring to FIG. 2, the media device 104 may receive the first image data 214 captured by the camera 124 disposed within the second earpiece 112. The method 700 includes receiving fourth image data captured by the camera disposed within the second earpiece, at 708. For example, referring to FIG. 2, the media device 104 may receive the second image data 218 captured by the camera 124 disposed within the second earpiece 112.

The method 700 also includes identifying a movement (e.g., a head movement) based on the first and second image data received from the first camera, and the first and second image data received from the second camera, at 710. For example, referring to FIG. 2, the image module 130 of the media device 104 may identify head movement(s) 202 based on the first image data 206 and the second image data 210 received from the camera 116 disposed within the first earpiece 100 and based on the first image data 214 and the second image data 216 received from the camera 124 disposed within the second earpiece 112.

In response to determining that the directional orientation criteria are not satisfied, the method 700 may include sending an audio signal to the audio headset device, at 712. The audio signal may include updated navigation directions to a particular location. For example, referring to FIG. 2, the image module 130 may provide information to the navigation module 132, and the navigation module 132 may determine whether the directional orientation criteria (e.g., a position of a user's head to receive navigation directions to a particular location) are satisfied.

In the particular embodiment illustrated in FIG. 7, the method 700 also includes sending an audio signal to the audio headset device in response to determining that the directional orientation criteria are satisfied, at 714. The audio signal may include a confirmation of correct positioning (e.g., of a user's head) for receiving navigation directions to the particular location. For example, referring to FIG. 2, in some cases, the media device 104 may send an audio signal to the first earpiece 110, to the second earpiece 112, or a combination thereof.

Thus, FIG. 7 illustrates a particular embodiment of a method to identify a movement (e.g., a head movement) based on image data captured by cameras disposed within earpieces of an audio headset device and sending an audio signal to the audio headset device based on the identified movement.

Figure 8:
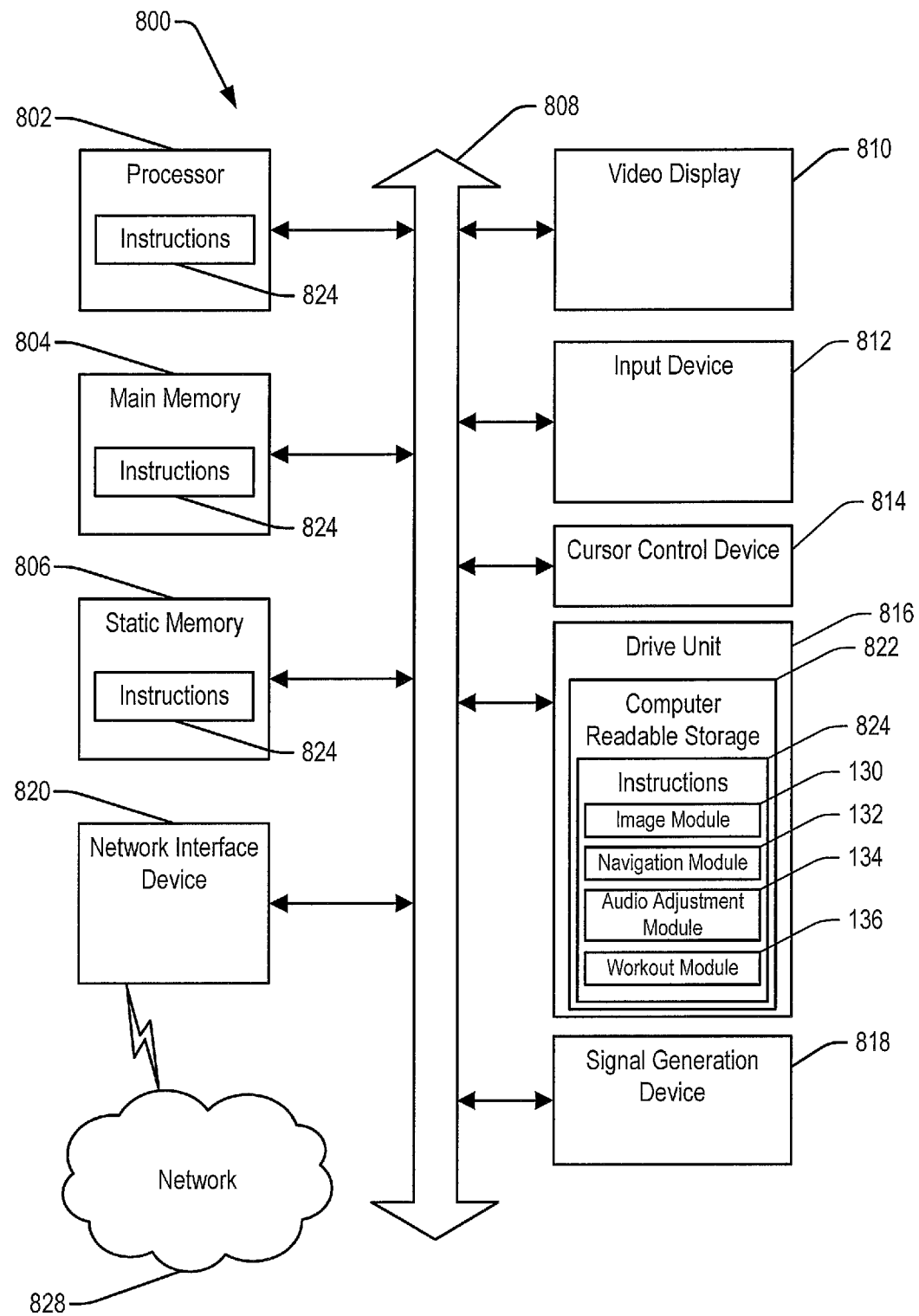
FIG. 8 is a block diagram of an illustrative embodiment of a general computer system.

Referring to FIG. 8, an illustrative embodiment of a general computer system is shown and is designated 800. The computer system 800 includes a set of instructions that can be executed to cause the computer system 800 to perform any one or more of the methods or computer based functions disclosed herein. The computer system 800 may operate as a standalone device or may be connected, e.g., using a network, to other computer systems or peripheral devices. For example, the computer system 800 may include or be included within the media device 104 described with reference to FIGS. 1-4.

In a networked deployment, the computer system 800 may operate in the capacity of a server or as a client user computer in a server-client user network environment, or as a peer computer system in a peer-to-peer (or distributed) network environment. The computer system 800 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular embodiment, the computer system 800 may be implemented using electronic devices that provide video, audio, or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. For example, the processor 802 may include or correspond to a processor of the media device 104. Moreover, the computer system 800 may include a main memory 804 and a static memory 806, which can communicate with each other via a bus 808. For example, the main memory 804 may include or correspond to a memory of the media device 104. As shown, the computer system 800 may further include a video display unit 810, such as a liquid crystal display (LCD), a light emitting diode (LED) display, a touch screen display, a flat panel display, or a solid state display. Additionally, the computer system 800 may include an input device 812, such as a remote control device or a keyboard, and a cursor control device 814, such as a mouse. In some embodiments, the input device 812 and the cursor control device 814 may be integrated into a single device, such as a capacitive touch screen input device. The computer system 800 may also include a drive unit 816, a signal generation device 818, such as a speaker, and a network interface device 820. Some computer systems 800 may not include an input device (e.g., a server may not include an input device).

In a particular embodiment, as depicted in FIG. 8, the drive unit 816 may include computer-readable storage 822 in which one or more sets of instructions 824, e.g. software, can be embedded. The computer-readable storage 822 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 824 may embody one or more of the methods or logic as described herein. In the embodiment illustrated in FIG. 8, the instructions 824 include the image module 130, the navigation module 132, the audio adjustment module 134, and the workout module 136. The instructions 824, including the image module 130, the navigation module 132, the audio adjustment module 134, and the workout module 136, may be executable by the processor 802 to perform one or more functions or methods described herein, such as the methods 500, 600, and 700 described with reference to FIG. 5, FIG. 6, and FIG. 7, respectively. In a particular embodiment, the instructions 824 may reside completely, or at least partially, within the main memory 804, the static memory 806, and/or within the processor 802 during execution by the computer system 800. The main memory 804 and the processor 802 also may include a computer-readable storage device.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes computer-readable storage 822 that stores instructions 824, so that a device connected to a network 828 may communicate voice, video or data over the network 828. While the computer-readable storage 822 is shown to be a single device, the computer-readable storage 822 may include a single device or multiple devices, such as a centralized or distributed database, and/or associated caches and servers that store one or more sets of instructions. The computer-readable storage 822 is capable of storing a set of instructions for execution by a processor to cause a computer system to perform any one or more of the methods or operations disclosed herein. For example, the computer-readable storage 822 may store instructions for execution by a processor to cause a computer system to perform any one or more of the methods 500, 600, and 700 described with reference to FIG. 5, FIG. 6, and FIG. 7, respectively.

In a particular non-limiting, exemplary embodiment, the computer-readable storage 822 may include a solid-state memory such as embedded memory (or a memory card or other package that houses one or more non-volatile read-only memories). Further, the computer-readable storage 822 may be a random access memory or other volatile re-writable memory. Additionally, the computer-readable storage 822 may include a magneto-optical or optical device, such as a disk or tapes or other storage device. Accordingly, the disclosure is considered to include any one or more of computer-readable storage and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 800 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
receiving, at a media device from an accessory device, first image data captured by a first camera disposed within a first earpiece of the accessory device;
receiving second image data captured by the first camera;
receiving third image data captured by a second camera disposed within a second earpiece of the accessory device;
receiving fourth image data captured by the second camera;
generating a first composite image based on the first image data and the third image data;
generating a second composite image based on the second image data and the fourth image data;
identifying, at a processor of the media device, a particular movement of a user of the accessory device based on the first composite image and the second composite image;
based on the particular movement indicating that the user has a first orientation, generating a first signal indicating that the user is oriented away from a particular location; and
in response to determining, after the generating the first signal and based on the second image data, that the user has a second orientation, generating a second signal indicating that the user is oriented toward the particular location, wherein one or both of the first signal and the second signal further indicate navigation directions to the particular location.

2. The method of claim 1, further comprising:
receiving at the media device a location request indicating the particular location; and
sending an audio message to the accessory device that informs the user whether a particular limb of the user associated with the particular movement is pointing toward the particular location.

3. The method of claim 1, further comprising receiving, at the media device, a specific phrase from the user of the accessory device before the identifying the particular movement.

4. The method of claim 1, further comprising identifying, at the processor, another movement of the user before identifying the particular movement.

5. The method of claim 1, further comprising determining, at the processor, that the particular movement does not correspond to a rhythmic movement associated with the user before generating the first signal.

6. The method of claim 1, wherein a limb associated with the particular movement includes a leg.

7. The method of claim 1, wherein a limb associated with the particular movement includes an arm.

8. The method of claim 1, further comprising adjusting, based on the particular movement, a volume of audio output of the accessory device.

9. A computer-readable hardware storage device storing instructions executable by a processor to perform operations, the operations comprising:
receiving, from an accessory device, first image data captured by a first camera disposed within a first earpiece of the accessory device;
receiving second image data captured by the first camera;
receiving third image data captured by a second camera disposed within a second earpiece of the accessory device;
receiving fourth image data captured by the second camera;
generating a first composite image based on the first image data and the third image data;
generating a second composite image based on the second image data and the fourth image data;
identifying a particular movement of a user of the accessory device based on the first composite image and the second composite image;
based on the particular movement indicating that the user has a first orientation, generating a first signal indicating that the user is oriented away from a particular location; and
in response to determining, after the generating the first signal and based on the second image data, that the user has a second orientation, generating a second signal indicating that the user is oriented toward the particular location, wherein one or both of the first signal and the second signal further indicate navigation directions to the particular location.

10. The computer-readable hardware storage device of claim 9, wherein the identifying of the particular movement comprises comparing a first position of a leg in the first image data to a second position of the leg in the second image data.

11. The computer-readable hardware storage device of claim 9, wherein the operations further comprise identifying a head movement, a hand movement, or a leg movement based on the first composite image and the second composite image.

12. An apparatus comprising:
a memory; and
a processor coupled to the memory and configured to:
receive, from an accessory device, first image data captured by a first camera disposed within a first earpiece of the accessory device;
receive second image data captured by the first camera;
receive third image data captured by a second camera disposed within a second earpiece of the accessory device;
receive fourth image data captured by the second camera;
generate a first composite image based on the first image data and the third image data;
generate a second composite image based on the second image data and the fourth image data;
identify a particular movement of a user of the accessory device based on the first composite image and the second composite image;
based on the particular movement indicating a first orientation of the user, generate a first signal indicating that the user is oriented away from a particular location; and in response to determining, after the generating the first signal and based on the second image data, that the user has a second orientation, generate a second signal indicating that the user is oriented toward the particular location, wherein one or both of the first signal and the second signal further indicate navigation directions to the particular location.

13. The apparatus of claim 12, wherein the processor is further configured to receive data from an accelerometer in the accessory device.

14. The apparatus of claim 12, wherein the processor is further configured to receive data from a compass in the accessory device.

15. The apparatus of claim 12, wherein the processor is further configured to receive a specific phrase from the user of the accessory device before the identifying the particular movement.

16. The apparatus of claim 12, wherein the processor is further configured to detect one or more obstacles indicated by the first composite image and to generate an alert further based on detecting the one or more obstacles.

17. The apparatus of claim 12, wherein the first image data and the second image data represent a left side of the user, and wherein the third image data and the fourth image data represent a right side of the user.

18. The apparatus of claim 12, wherein the processor is further configured to determine a change in orientation of the user from the first orientation to the second orientation based on the first composite image and the second composite image.

* * * * *